(12) United States Patent
Cashatt et al.

(10) Patent No.: US 12,504,128 B2
(45) Date of Patent: Dec. 23, 2025

(54) ON TANK MANIFOLD VALVE ASSEMBLY

(71) Applicant: LINAMAR CORPORATION, Guelph (CA)

(72) Inventors: Myrna E. Cashatt, Oxford, MI (US); Blake Osecki, Farmington Hills, MI (US)

(73) Assignee: Linamar Corporation, Guelph (CA)

( * ) Notice: Subject to any disclaimer, the term of this patent is extended or adjusted under 35 U.S.C. 154(b) by 0 days.

(21) Appl. No.: 18/717,267

(22) PCT Filed: Dec. 6, 2021

(86) PCT No.: PCT/US2021/062083
§ 371 (c)(1),
(2) Date: Jun. 6, 2024

(87) PCT Pub. No.: WO2023/107094
PCT Pub. Date: Jun. 15, 2023

(65) Prior Publication Data
US 2025/0043920 A1    Feb. 6, 2025

(51) Int. Cl.
*F17C 13/04*    (2006.01)

(52) U.S. Cl.
CPC ...... *F17C 13/04* (2013.01); *F17C 2201/0138* (2013.01); *F17C 2203/0604* (2013.01);
(Continued)

(58) Field of Classification Search
CPC ............... Y10T 137/4807; F17C 13/04; F17C 2201/0138; F17C 2203/0604; F17C 2203/0673; F17C 2205/0138; F17C 2205/0146; F17C 2205/0332; F17C 2205/0385; F17C 2221/012; F17C 2221/033; F17C 2223/036; F17C 2270/0168
See application file for complete search history.

(56) References Cited

U.S. PATENT DOCUMENTS

| 1,259,090 | A  | * | 3/1918 | Kondogiani et al. ... F16H 61/46 60/431 |
| 6,527,075 | B1 | * | 3/2003 | Izuchukwu ............ A61G 3/001 180/69.5 |

(Continued)

FOREIGN PATENT DOCUMENTS

| DE | 1016214577 A1 | 2/2018 |
| DE | 1018000756 A1 | 1/2019 |

(Continued)

*Primary Examiner* — Jessica Cahill
(74) *Attorney, Agent, or Firm* — Miller Canfield (57) ABSTRACT

A type IV conformable pressure vessel assembly is provided comprising a plurality of elongated folded tanks and an on-tank-valve (OTV) manifold assembly configured to pass fluid into and out of an interior of the plurality of elongated folded tanks through a plurality of first and second filling couplers directly connected to respective first and second ends of the plurality of elongated folded tanks. Each of the plurality of elongated folded tanks have at least two chambers for the storage of fluid. The manifold valve assembly receives fluid from an external source, selectively provides the external fluid to one or more of the plurality of first and second filling couplers.

17 Claims, 10 Drawing Sheets

(52) U.S. Cl.
CPC ............... *F17C 2203/0673* (2013.01); *F17C 2205/0138* (2013.01); *F17C 2205/0146* (2013.01); *F17C 2205/0332* (2013.01); *F17C 2205/0385* (2013.01); *F17C 2221/012* (2013.01); *F17C 2221/033* (2013.01); *F17C 2223/036* (2013.01); *F17C 2270/0168* (2013.01)

(56) References Cited

U.S. PATENT DOCUMENTS

| | | | |
|---|---|---|---|
| 10,054,267 B2 * | 8/2018 | Yersak | F17C 13/084 |
| 11,892,123 B2 * | 2/2024 | Saade Saade | F17C 1/06 |
| 12,049,985 B2 * | 7/2024 | Kondogiani | F17C 1/00 |
| 2014/0216599 A1 * | 8/2014 | Loewenthal | F17C 5/00 |
| | | | 141/4 |
| 2015/0048095 A1 * | 2/2015 | Sanders | B63C 11/08 |
| | | | 220/586 |
| 2018/0283610 A1 * | 10/2018 | Wexler | F17C 1/16 |
| 2018/0283612 A1 * | 10/2018 | Wexler | F17C 13/026 |
| 2022/0260210 A1 * | 8/2022 | Killeen | F17C 5/06 |

FOREIGN PATENT DOCUMENTS

| | | | | |
|---|---|---|---|---|
| DE | 102017220715 A1 * | 5/2019 | ............ | F17C 13/084 |
| WO | WO2020264584 A1 | 12/2020 | | |
| WO | WO2021055319 A1 | 3/2021 | | |

* cited by examiner

ON TANK MANIFOLD VALVE ASSEMBLY

BACKGROUND OF THE INVENTION

1. Field of the Invention

The present invention relates to filling Type IV pressure vessels with hydrogen gas. More particularly, the invention relates to a compressed gas pressure vessel assembly having a plurality of pressure vessels fluidically connected through an on tank manifold valve assembly.

2. Description of Related Art

Pressure vessels commonly store fluids and/or gases under pressure, such as natural gas, oxygen, nitrogen, hydrogen, propane, and the like. Type IV pressure vessels or tanks have a metal-free construction typically comprising a carbon fiber or composite wound and/or braided over a thermoplastic polymeric liner. Certain Type IV pressure vessels comprise an elongated vessel having a plurality of chambers for storage of gas, also described as conformable pressure vessels. The elongated pressure vessels can be configured for use as pressurized gaseous fuel tanks for use in vehicles.

Typically, a first valve is coupled to a first end of the pressure vessel for filling the pressure vessel with compressed gas. Further, elongated pressure vessels may have a second valve coupled to a second end of the pressure vessel. The first and second valves are configured to transfer gas into an internal space of the pressure vessel defined by a liner outer wall.

The elongated pressure vessel can experience heating when filling due to heat of compression and, for some gases, to the Joule-Thomson effect. The gas within the pressure vessel is compressed as additional gas is added to the pressure vessel, resulting in heat generation. For safety, some compressed fuel filling stations control the filling rate to avoid dangerously high temperatures. In addition, the high temperatures can be undesirable because they can result in low density at a given pressure, thus requiring overpressure to reach the target density (state of charge near 100%) or under-filled pressure vessels.

Such heat generation can therefore result in undesirably long filling times that take longer than filling gasoline or diesel fuel tanks and/or result in under-filled pressure vessels. To mitigate these issues associated with pressure vessels, many stations have an option of gas pre-cooling. With gas pre-cooling, the gas is cooled to a low temperature (e.g., as low −40° C.) before the gas enters the pressure vessel. This has the effect of lowering the maximum temperature that the gas reaches due to heat of compression, since the initial temperature is lower.

Gas pre-cooling can add significant additional complexity to the construction of fueling stations, which can undesirably increase capital cost and operational cost for the fueling station. This increased cost may be transferred to the customer in the form of higher gas prices. In addition, pre-cooling components can have poor reliability in some examples, resulting in significant station downtime and additional cost due to maintenance and replacement parts.

Elongated conformable pressure vessels, such as discussed herein, can be advantageous over conventional monolithic compressed gas tanks because the conformable shapes can have more surface area per unit volume of storage. Such increased surface area can allow for more rapid heat dissipation, which can increase fast-fill performance. In addition, such conformable tanks can have a smaller cross-sectional area, which can result in higher flow velocity during filling and hence better convective heat transfer from the gas to the pressure vessel wall (i.e., higher Nusselt number).

During filling or fast-fill, such conformable pressure vessels can reach a lower average temperature than conventional monolithic pressure vessels. This can be because such conformable pressure vessels have a higher ratio of surface area to volume, and because the gas can have a higher average speed due to the smaller tank diameter, resulting in greater convective heat transfer. This can result in a reduced need for gas pre-cooling. Conformable pressure vessels can thus be filled with fluid that is precooled to a higher temperature or not precooled at all, while still achieving the filling speeds that are normally associated with pre-cooled gas.

However, insufficient mixing can occur during the filling of various conformable pressure vessels due to their elongated shape, meaning that the difference between maximum and minimum temperature at the end of a filling process can be much more extreme than for other configurations of pressure vessels. In particular, when gas is added to the pressure vessel through the first valve attached at the first end of the pressure vessel, the gas temperature near the first end of the pressure vessel can remain close to the temperature of the inflowing gas, since the flow speed at the first end can result in good heat transfer to the polymeric liner and outer composite shell. Chambers of the pressure vessel that are near the second end of the pressure vessel, on the other hand, can heat up considerably because there is little flow in the far region of the pressure vessel. Further, these chambers near the second end of the pressure vessel have poor convective heat transfer.

A first known method of mitigating such a temperature rise near the second end of the pressure vessel is by filling from alternating ends of the pressure vessel, such as disclosed in U.S. publication No. 2019/120432. For example, at the start of fill, the pressure vessel can be filled through the first valve attached to the first end of the pressure vessel, allowing the temperature of the fluid near the second end of the pressure vessel to rise. When the temperature of the fluid near the second end reaches a defined high value, the first valve at the first end of the pressure vessel is closed and the pressure vessel is filled through the second valve at the second end. This pattern can be repeated until the pressure vessel is filled.

However, the first known method can result in elevated fluid temperatures in chambers midway between the two ends of the pressure vessel. Additional pre-cooling of the gas may be required and/or pre-cooling to a lower temperature to assure that the fluid in chambers furthest from the first and second valves have temperatures within a predetermined temperature range. Further, additional hardware and controls are required to support switching between the valves at each end of the pressure vessel during fill.

It is desirable, therefore, to reduce the elevated fluid temperatures in chambers midway between two ends of the pressure vessel during the filling process. In addition, it is desirable to provide a pressure vessel assembly comprising an on-tank-valve manifold valve that fluidically couples opposing ends of a plurality of elongated pressure vessels for filling and removing fluid from an interior of each of the elongated pressure vessels.

SUMMARY OF THE INVENTION

A type IV conformable pressure vessel assembly is provided comprising a plurality of elongated folded tanks and an on-tank-valve (OTV) manifold assembly configured to pass fluid into and out of an interior of the plurality of elongated folded tanks through a plurality of first and second filling couplers directly connected to respective first and second ends of the plurality of elongated folded tanks. Each of the plurality of elongated folded tanks have at least two chambers for the storage of fluid. The manifold valve assembly receives fluid from an external source and selectively provides the external fluid to one or more of the plurality of first and second filling couplers.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE EMBODIMENTS

Figure 1:
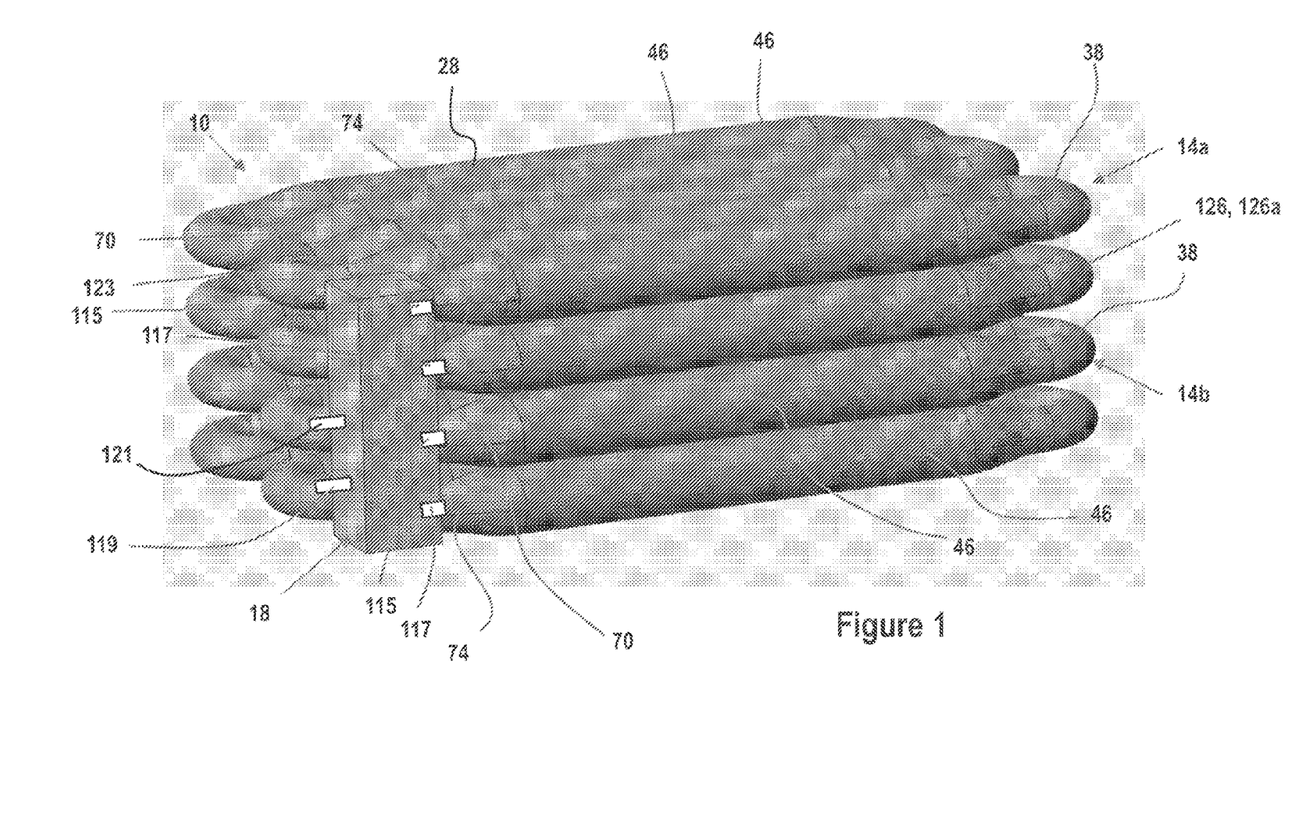
FIG. 1 is a perspective view of a pressure vessel assembly including an on-tank-valve manifold assembly fluidically coupled to a plurality of elongated conformable pressure tanks, according to one embodiment of the present invention.

Referring to the Figures, wherein like numerals indicate like or corresponding parts throughout the several views, a type IV pressure vessel assembly 10 for containing liquids and/or gases under pressure is shown in FIG. 1, according to one embodiment of the present invention. The pressure vessel assembly 10 is suitable for storage of compressed liquids and/or gases, such as hydrogen, nitrogen, natural gas, helium, dimethyl ether, liquefied petroleum gas, xenon, and the like. A pressure vessel assembly 10 for storage of hydrogen for automotive applications typically is designed for about 5,000 PSI to about 10,000 PSI of internal pressure during normal use. In comparison, pressure vessel assemblies 10 for storage of compressed natural gas are typically designed for about 3,000 PSI of internal pressure during normal use.

Figure 2:
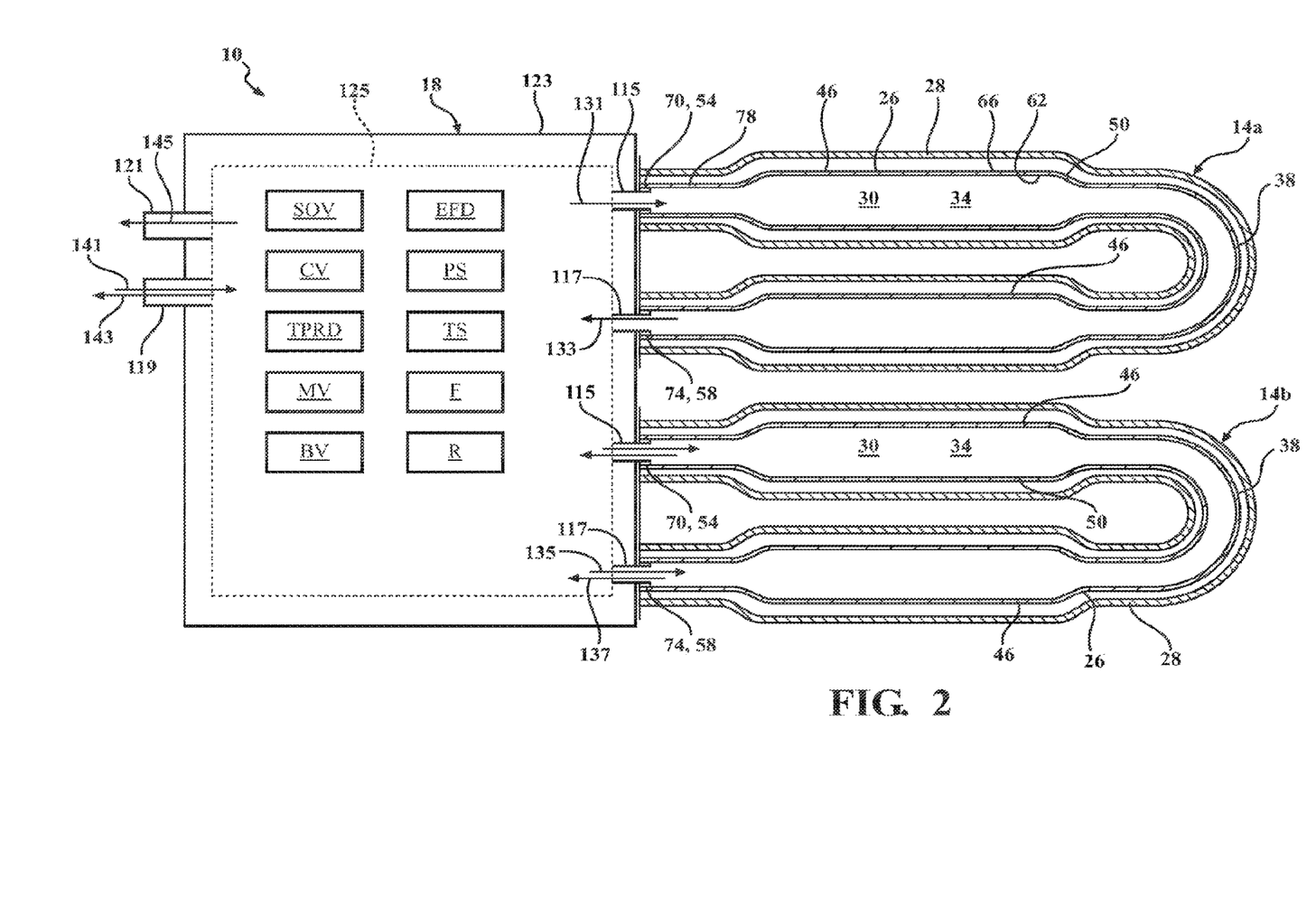
FIG. 2 is a diagrammatic view of the pressure vessel assembly of FIG. 1, illustrating an on-tank-valve manifold valve assembled with first and second elongated conformable pressure tanks, according to another embodiment of the present invention.

Referring to FIG. 1, the pressure vessel assembly 10 of the present invention comprises a plurality of elongated conformable pressure tanks 14a, 14b (alternatively described herein as elongated conformable tanks 14a, 14b and elongated folded tanks 14a, 14b) fixedly coupled to an on-tank-valve manifold valve assembly 18 (described herein as an OTV manifold assembly 18). FIG. 2 shows a diagrammic view of the pressure vessel assembly 10 of FIG. 1 and illustrates an OTV manifold assembly 18 directly coupled with first and second elongated conformable tanks 14a, 14b. Referring to FIG. 2, each of the elongated conformable tanks 14a, 14b has a polymeric liner 26 having an interior 30 for storage of fluid and/or gas 34. As will be further described below, the polymeric liner 26 is surrounded by an outer composite shell 28 to form each of the elongated conformable tanks 14a, 14b. The terms "fluid" and "gas" are used interchangeably herein since gases such as hydrogen gas will be in a gaseous form or a fluid form (e.g., "liquid" form) depending on the pressure and temperature at which the hydrogen gas is stored. While two elongated conformable tanks 14a, 14b are shown in the Figures, the pressure vessel assembly 10 can comprise a plurality of elongated conformable tanks 14a, 14b.

Figure 3:
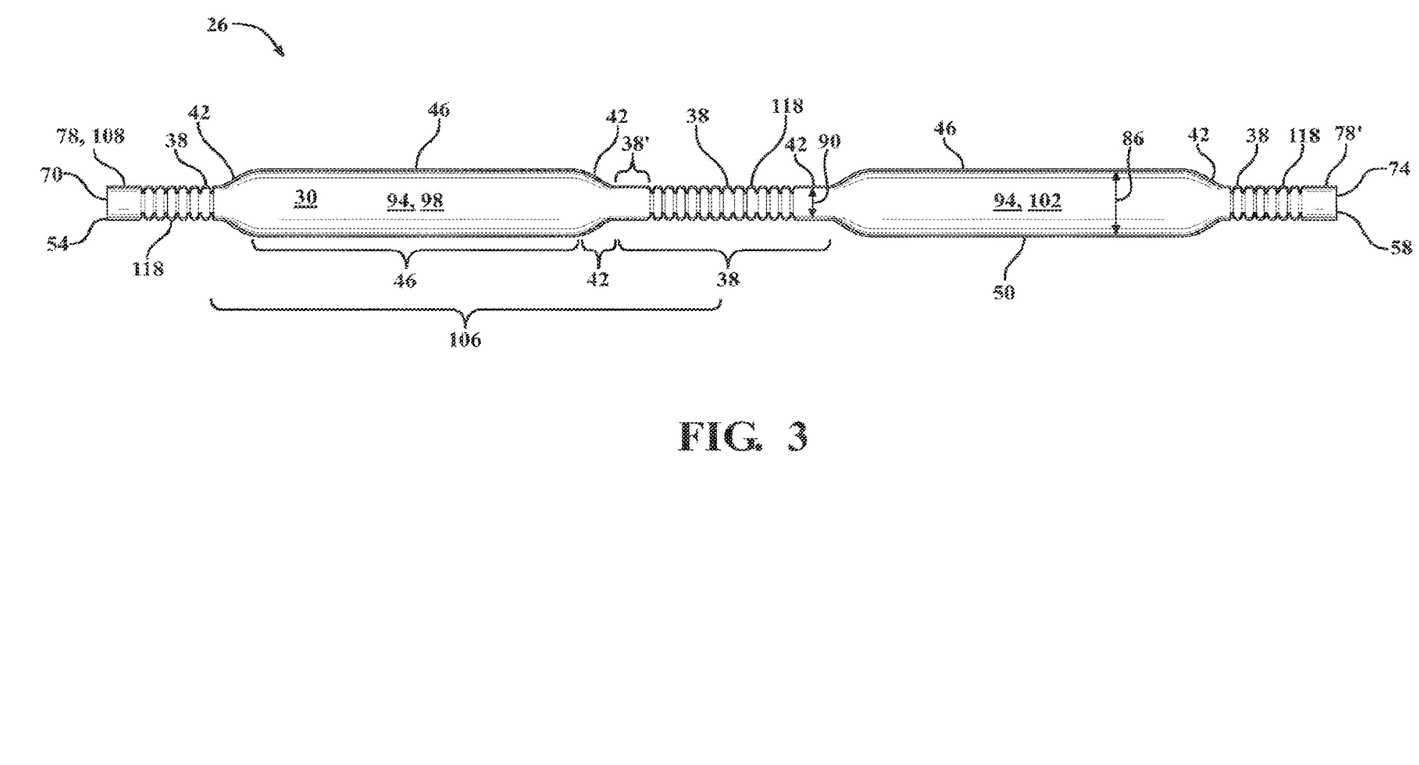
FIG. 3 shows a perspective view of a polymeric liner removed from one of the elongated conformable pressure tanks of FIG. 1.

FIG. 3 illustrates one embodiment of a bare polymeric liner 26 of an exemplary elongated conformable tank 14a, 14b comprising a hollow body 30 having connector portions 38, taper portions 42, and tubing portions 46. The hollow body 30 is defined by an elongated cylindrical wall 50 extending between a first terminal end 54 and a second terminal end 58 of the polymeric liner 26. Turning to FIG. 2, the polymeric liner 26 includes opposing inner and outer surfaces 62, 66, an inlet opening 70 at the first terminal end 54 of the polymeric liner 26, and an outlet opening 74 at the second terminal end 58 of the polymeric liner 26. Each of the inlet opening 70 and the outlet opening 74 to the polymeric liner 26 can be used to pass fluid and/or gas 34 into and/or out of the interior 30 of the polymeric liner 26 as desired. Each of the inlet and outlet openings 70, 74 of the polymeric liner 26 are defined by a neck outlet 78 of the polymeric liner 26. It will be understood that relative terms such as "inlet opening" 70 and "outlet opening" 74 refer to a specific opening in the elongated conformable tank 14a, 14b regardless as to whether fluid 34 is added to or removed from the elongated conformable tank 14a, 14b. Thus, it will be understood that the inlet opening 70, alternately described as the inlet/outlet opening 70 and first opening 70, refers to the opening associated with the first terminal end 54 of the elongated conformable tank 14a, 14b. Likewise, it will be understood that the outlet opening 74, alternately described as inlet/outlet opening 74 and second opening 74, refers to the opening associated with the second terminal end 58 of the elongated conformable tank 14a, 14b.

Referring to FIG. 3, the polymeric liner 26 includes a plurality of elongated rigid tubing portions 46 having a first diameter 86, a plurality of connector portions 38 having a second diameter 90 that is smaller than the first diameter 86, and taper portions 42 disposed between and coupling successive elongated rigid tubing portions 46 and connector portions 38. The first diameter 86 and the second diameter 90 are defined as the outer diameter 86, 90 of the tubing portions 46 and the connector portions 38, respectively. Each of the plurality of elongated rigid tubing portions 46 defines a respective chamber 94 for storage of fluid 34 with a first chamber 98 defined adjacent the first terminal end 54 of the polymeric liner 26 and a last chamber 102 defined adjacent the second terminal end 58 of the polymeric liner 26. Other embodiments of the polymeric liner 26 can include any number of chambers 94 between the first chamber 98 and the last chamber 102 as desired for specific applications. Alternatively, the polymeric liner 26 can include a single elongated chamber 94 extending between the terminal ends 54, 58 of the polymeric liner 26.

An exemplary repeating liner portion 106 is illustrated in FIG. 3. The repeating liner portion 106 is defined as comprising a single rigid tubing portion 46 in combination with taper portions 42 and connector portions 38 attached to the rigid tubing portion 46. Individual liner portions 106 can vary in dimensions, shapes, and the like. Certain liner portions 106 can include tubing portions 46, connector portions 38, and tapered portions 42 having different outer diameters, lengths, and shapes, as non-limiting examples. In some embodiments, certain liner portions 106 may have a length shorter or longer than the length of other liner portions 106. In other embodiments, the length of individual connector portions 38 can be selected such that the polymeric liner 26 is foldable into a desired stacking architecture 126 (shown in FIG. 1). Thus, the repeating liner portions 106 can be identical or the repeating liner portions 106 can include one or more configurations. For example, the polymeric liner 26 sections at the terminal ends 54, 58 can include connector portions 38 having cuff portions 108 configured to matingly and/or frictionally engage with boss-style fittings.

The connector portions 38, shown in FIG. 3, can be corrugated 118, which allow the connector portions 38 to be flexible such that the polymeric liner 26 can be folded into a stacking architecture 126 (shown in FIG. 1) to fill a predetermined space and/or folded into a housing 123. Non-corrugated connector portions 38' can be rigid in various embodiments. In various embodiments, the connector portions 38 can have a diameter 90 that is smaller than the diameter 86 of the tubing portions 46, with the taper portions 42 providing a transition between the diameter 90, 86 of the connector portions 38 and the tubing portion 46. However, further embodiments can comprise a polymeric liner 26 with portions 38, 42, 46 having one or more suitable diameters 86, 90, and in further embodiments, a polymeric liner 26 can have portions 38, 42, 46 that are non-cylindrical, which can include various shapes. Similarly, in some embodiments, the tubing portions 46 can comprise corrugations 118.

Preferably, the polymeric liner 26 is manufactured as a seamless liner with no welds and using a single material, as illustrated in FIG. 3. However, in some embodiments individual liner portions 106 comprising a single chamber 94 can be connected together to form an elongated polymeric liner 26 comprising a plurality of chambers 94. In some embodiments, a polymeric liner 26 can be made by forming various pieces 38, 42, 46 of the polymeric liner 26 and then coupling the pieces 38, 42, 46 together. For example, connector portions 38 can be manufactured separately from the taper portions 42, the tubing portion 46, and/or the cuff portions 108. Such separate portions 38, 42, 46, 108 can be subsequently coupled together to form the polymeric liner 26.

The polymeric liner 26, shown in FIG. 3, is generally formed from one or more polymeric materials such as Nylon (PA), ethylene-vinyl acetate (EVA), linear low-density polyethylene (LLDPE), low-density polyethylene (LDPE), high-density polyethylene (HDPE), polypropylene (PP), ethylene vinyl alcohol (EVOH), polytetrafluoroethylene (PTFE), polyurethane (PU), polyvinyl chloride (PVC), and/or similar materials. The polymeric liner 26 can be formed of a single layer of polymeric material. Alternatively, the polymeric liner 26 can be formed of a multi-layered structure of two or more polymeric layers. Further, one or more metal layers can be included within the polymeric liner 26, as desired for specific applications. The polymeric liner 26 can be wrapped and/or over-braided with fiber strands impregnated with resin, or with other suitable materials, to increase the strength of the polymeric liner 26 and thereby increase the duty pressure under which the polymeric liner 26 may safely operate. Additionally, braiding can be disposed in a plurality of layers in various embodiments. The one or more layers of fiber strands impregnated with resin form a hard outer composite shell 28 after the resin is cured.

The outer composite shell 28, shown in FIG. 1, includes one or more layers of resin impregnated fiber strands. Suitable fibers for the outer composite shell 28 include one or more of carbon fiber, glass fiber, basalt fiber, boron fiber, aramid fiber, high-density polyethylene fiber (HDPE), Zylon™ poly(p-phenylene-2,6-benzobisoxazole fiber (PBO), aramid fiber, Kevlar® poly-paraphenylene terephthalamide fiber, polyethylene terephthalate fiber (PET), Nylon fiber (PA), polyethylene naphthalate (PEN), polyester fiber (PL), polypropylene fiber (PP), polyethylene fiber (PE), a metal, ethylene vinyl alcohol fiber (EVOH), polyurethane fiber (PU), and the like. Suitable resins include one or more of epoxy resin, vinylester resin, thermoplastic resin, polyester resin, urethane, thermoplastic resin, and the like. The selection of materials and dimensions for the polymeric liner 26, as well as the type and amount of resin and fiber forming the outer composite shell 28, are selected based in part on the desired operating conditions of each of the elongated conformable tanks 14a, 14b.

The elongated conformable tanks 14a, 14b of FIG. 1 are formed when the polymeric liner 26 is covered with the outer composite shell 28, folded into a desired folded shape 126, and the resin cured to harden the outer composite shell 28. In various embodiments, the elongated conformable tanks 14a, 14b can be folded into a three-dimensional structure 126. FIG. 1 illustrates one embodiment where an over-braided polymeric liner 26 is folded and held in a stacking architecture 126. Preferably, the inlet opening 70 of each of the elongated conformable tanks 14a, 14b is arranged adjacent the outlet opening 74 of the respective elongated conformable tanks 14a, 14b, as generally shown in FIG. 1, such that the OTV manifold assembly 18 can directly connect to both the inlet and outlet openings 70, 74 of each of each of the elongated conformable tanks 14a, 14b.

Figure 6:
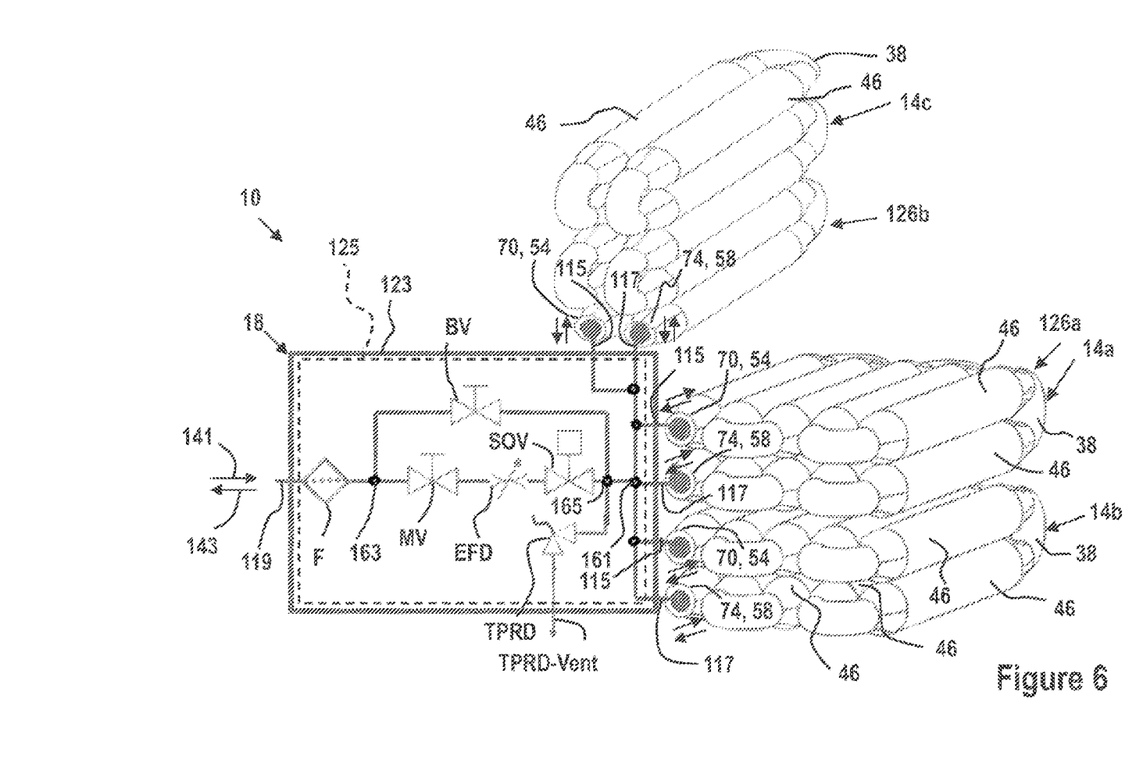
FIG. 6 is a diagrammatic view of another embodiment of the pressure vessel assembly of FIG. 5, illustrating the on-tank-manifold assembly directly coupled to horizontally stacked elongated conformable pressure tanks and directly coupled to vertically stacked elongated conformable pressure tanks.

In the embodiment shown in FIG. 1, the first elongated conformable tank 14a is stacked on top of the second elongated conformable tank 14b with the inlet openings 70 and the outlet openings 74 of the first and second conformable elongated tanks 14a, 14b adjacent to one another so that the OTV manifold assembly 18 can directly couple to both of the first and second elongated conformable tanks 14a, 14b. The stacking architecture 126 shown in FIG. 1 illustrates a vertical stacking pattern 126a with the individual elongated conformable tanks 14a, 14b being vertically stacked. As illustrated in FIG. 6, certain embodiments can include elongated conformable tanks 14a, 14b with a vertical stacking architecture 126a as well as one or more elongated conformable tanks 14c having a horizontal stacking architecture 126b. It will be understood that alternate folding patterns and stacking arrangements 126a, 126b can be employed to place all of the inlet openings 70 and all of the outlet openings 74 close together when a plurality of elongated conformable tanks 14a, 14b, 14c are included in the pressure vessel assembly 10. A single OTV manifold assembly 18 can be coupled directly to all of the inlet and outlet openings 70, 74 when the inlet and outlet openings 70, 74 are placed close together.

As shown in FIG. 1, the OTV manifold assembly 18 includes a plurality of first filling couplers 115 configured to couple the OTV manifold to each of the inlet openings 70 of the plurality of elongated conformable tanks 14a, 14b. In addition, the OTV manifold assembly 18 includes a plurality of second filling couplers 117 configured to couple the OTV manifold assembly 18 to each of the outlet openings 74 of the plurality of elongated conformable tanks 14a, 14b. It will be understood that fluid 34 can be added to the elongated conformable tanks 14a, 14b and removed from the elongated conformable tanks 14a, 14b through either or both of the inlet openings 70 and outlet openings 74 of each of the elongated conformable tanks 14a, 14b regardless of the relative descriptions of "inlet", "outlet", and "filling coupler". For example, in certain embodiments, the OTV manifold assembly 18 is configured to selectively provide fluid 34 simultaneously to all of the inlet openings 70 and the outlet openings 74 of the plurality of elongated conformable tanks 14a, 14b. In other embodiments, the OTV manifold assembly 18 can selectively provide fluid 34 to one or more of the inlet openings 70 and/or one or more of the outlet openings 74 as required for specific applications. Likewise, the OTV manifold assembly 18 can be configured to transfer fluid 34 from one or more of the elongated conformable tanks 14a, 14b to a third filling coupler 119 on the OTV manifold assembly 18. The third filling coupler 119 is configured for directly and/or indirectly coupling the OTV manifold assembly 18 to an external fluid source, a hydrogen filling station, and/or to a vehicle engine. In addition, the OTV manifold assembly 18 is configured to selectively provide fluid 34 from the interior 30 of the elongated conformable tanks 14a, 14b to the third filling coupler 119 when the OTV manifold assembly 18 is fluidically coupled to an external fuel cell supply line. In addition, the OTV manifold assembly 18 can include additional filling couplers, such as a fourth filling coupler 121 shown in FIG. 1, as desired for certain applications. The first, second, third, and fourth filling couplers 115, 117, 119, 121 are supported and connected through a housing 123 defining the body of the OTV manifold assembly 18.

FIG. 2 shows a diagrammatic illustration of selected internal structure 125 of the OTV manifold assembly 18, as represented by block 125. Referring to FIG. 2, the OTV manifold assembly 18 optionally includes a solenoid valve with automatic shut off SOV, one or more check valves CV, a temperature pressure relief device TPRD, a manually controlled valve MV, a bleed valve BV, an excess flow device EFD, as well as other components such as pressure sensors PS, temperature sensors TS, a filter F, an electronic controller, and the like as non-limiting examples. Certain embodiments optionally include a recirculation function R configured to recirculate fluid 34 between the outlet opening 74 and the inlet opening 70 through the OTV manifold assembly 18 for one or more of the elongated conformable tanks 14a, 14b. Optionally, the recirculation function R can be configured to selectively recirculate fluid 34 from one of the elongated conformable tanks 14a, 14b to another one of the elongated conformable tanks 14a, 14b. In additional embodiments, the recirculation function R mixes the recirculated fluid 34 with fluid 34 being added to the elongated conformable tanks 14a, 14b through one or more of the third and fourth filling couplers 119, 121.

Also illustrated in FIG. 2, the OTV manifold assembly 18 can selectively provide fluid 34 to the elongated conformable tanks 14a, 14b, as illustrated by arrow 131, through a dedicated first filling coupler 115 and through the inlet opening 70 of one of the elongated conformable tanks 14a. In addition, fluid 34 can be removed from the elongated conformable tanks 14a, 14b, as illustrated by arrow 133, through the associated outlet opening 74 and the second filling coupler 117. Alternatively, the OTV manifold assembly 18 can selectively provide fluid 34 to either or both of the inlet and outlet openings 70, 74 as well as selectively remove fluid 34 through either or both of the inlet and outlet openings 70, 74 of the elongated conformable vessel 14a, 14b, as illustrated by arrows 135 and 137. Likewise, fluid 34 can be selectively provided to and/or removed from the OTV manifold assembly 18 through one or more of the third and fourth filling couplers 119, 121, as illustrated by arrows 141 and 143. In other embodiments, the OTV manifold assembly 18 can include filling couplers having dedicated direction of flow, such as illustrated by the fourth filling coupler 121 and arrow 145.

Figure 4:
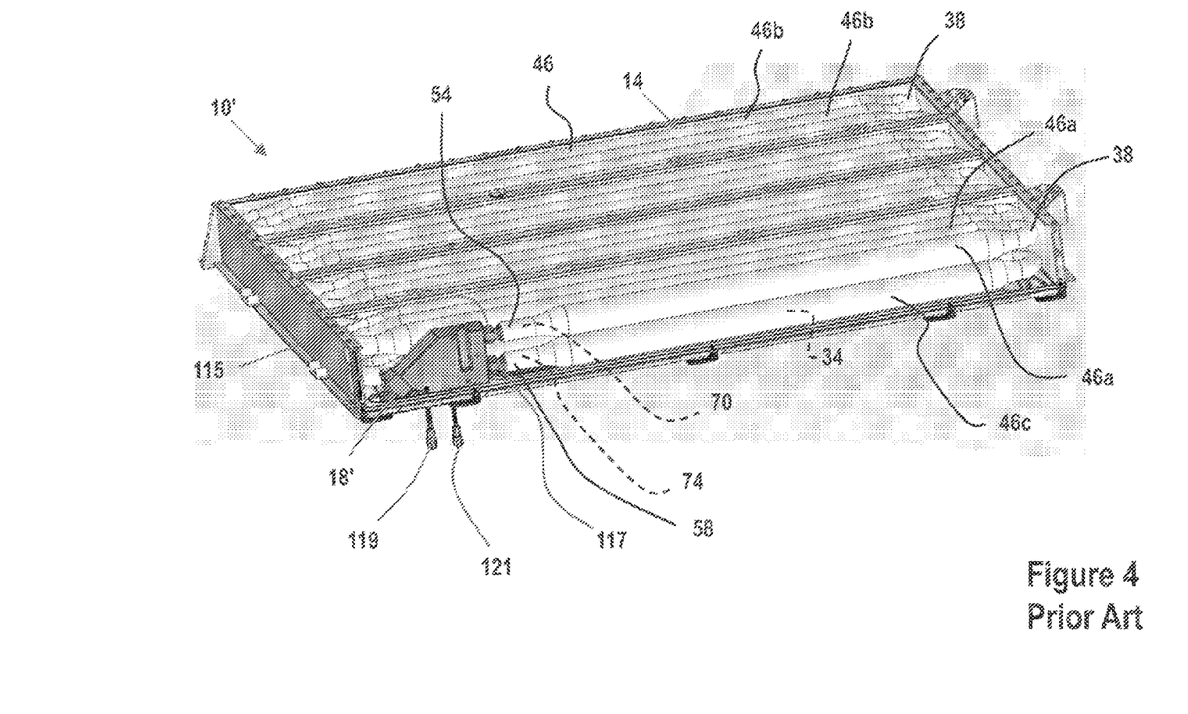
FIG. 4 is a perspective view of a known single elongated conformable pressure tank coupled to a typical on-tank-valve manifold assembly.

An exemplary know pressure vessel assembly 10' comprising a single elongated conformable pressure tank 14 coupled to a typical on-tank-valve (OTV) manifold assembly 18' is shown in FIG. 4. Elements in FIG. 4 that are the same or similar to those used above in FIGS. 1-3 have the same reference numbers for simplicity. Referring to FIG. 4, the known single elongated conformable pressure tank 14 includes a plurality of tubing portions 46 connected by connector portions 38 extending between a first terminal end 54 and a second terminal end 58. The known single elongated conformable pressure tank 14 shown in FIG. 4 includes an exemplary stack of thirty two tubing portions 46. The first terminal end 54 includes inlet opening 70 with the second terminal end 54 including outlet opening 74. The inlet opening 70 is directly coupled to a first filling coupler 115 extending from the OTV manifold assembly 18'. Likewise, the outlet opening 74 is directly coupled to a second filling coupler 117 extending from the OTV manifold assembly 18'. The OTV manifold assembly 18' further includes third and fourth filling couplers 119, 121 for adding and/or removing fluid 34 from the known elongated conformable pressure tank 14.

Referring to FIG. 4, during a filling process fluid is added to the known single elongated conformable pressure tank 14 through the OTV manifold assembly 18' and into the inlet opening 70. Often, fluid 34 is pre-cooled prior to adding the fluid 34 to the single elongated conformable pressure tank 14. Fluid 34 within the tubing portions 46 is compressed by the fluid 34 being added through the inlet opening 70. The compression of the fluid 34 in the tubing portions 46 generates heat. Typically, the tubing portions 46a receiving the pre-cooled fluid 34 has a lower internal fluid temperature than the fluid 34 stored in tubing portions 46b further away from the inlet opening 70 along the length of the single elongated conformable pressure tank 14. If the fluid 34 within the first tubing portions 46a is not mixed between the tubing portions 46c near the outlet opening 74 during the fill process, a temperature gradient is likely to develop across the tubing portions 46a, 46b, 46c, with the first tubing portion 46a showing a lower fluid temperature than the temperature of the fluid 34 stored in the last tubing portion 46c. Even when fluid 34 is mixed by withdrawing fluid 34 from the outlet opening 74, mixing the withdrawn fluid 34 with the pre-cooled fluid 34 received from outside of the OTV manifold assembly 18, and added to the inlet opening 70, an unacceptable temperature gradient can still develop for the elongated conformable pressure tank 14 having a plurality of tubing portions 46a, 46b, 46c.

The embodiment illustrated in FIGS. 1 and 2 reduce the potential temperature gradient that can develop during a fill process for a single elongated conformable pressure tank 14 having a plurality of tubing portions 46a, 46b, 46c by separating the single elongated conformable pressure tank 14 into a plurality of shorter elongated conformable pressure tanks 14a, 14b. The OTV manifold assembly 18 is configured to simultaneously directly couple with the inlet and outlet openings 70, 74 of the plurality of shorter elongated conformable pressure tanks 14a, 14b. For example, each of the first and second elongated conformable pressure tanks 14a, 14b shown in FIG. 1 includes ten tubing portions 46 for a combined amount of twenty tubing portions 46. The potential temperature gradient that can be produced during the filling process is reduced by splitting the desired tank volume into a plurality of elongated conformable pressure tanks 14a, 14b and simultaneously coupling all of inlet openings 70 and outlet openings 74 of the plurality of elongated conformable pressure tanks 14a, 14b through a single OTV manifold assembly 18. The OTV manifold assembly 18 is selectively configured to optimize the filling process for the plurality of elongated conformable pressure tanks 14a, 14b. Further, fluid 34 pressure can be equalized between the elongated conformable tanks 14a, 14b by fluidically coupling all of the elongated conformable pressure tanks 14a, 14b through a single OTV manifold assembly 18.

Figure 5:
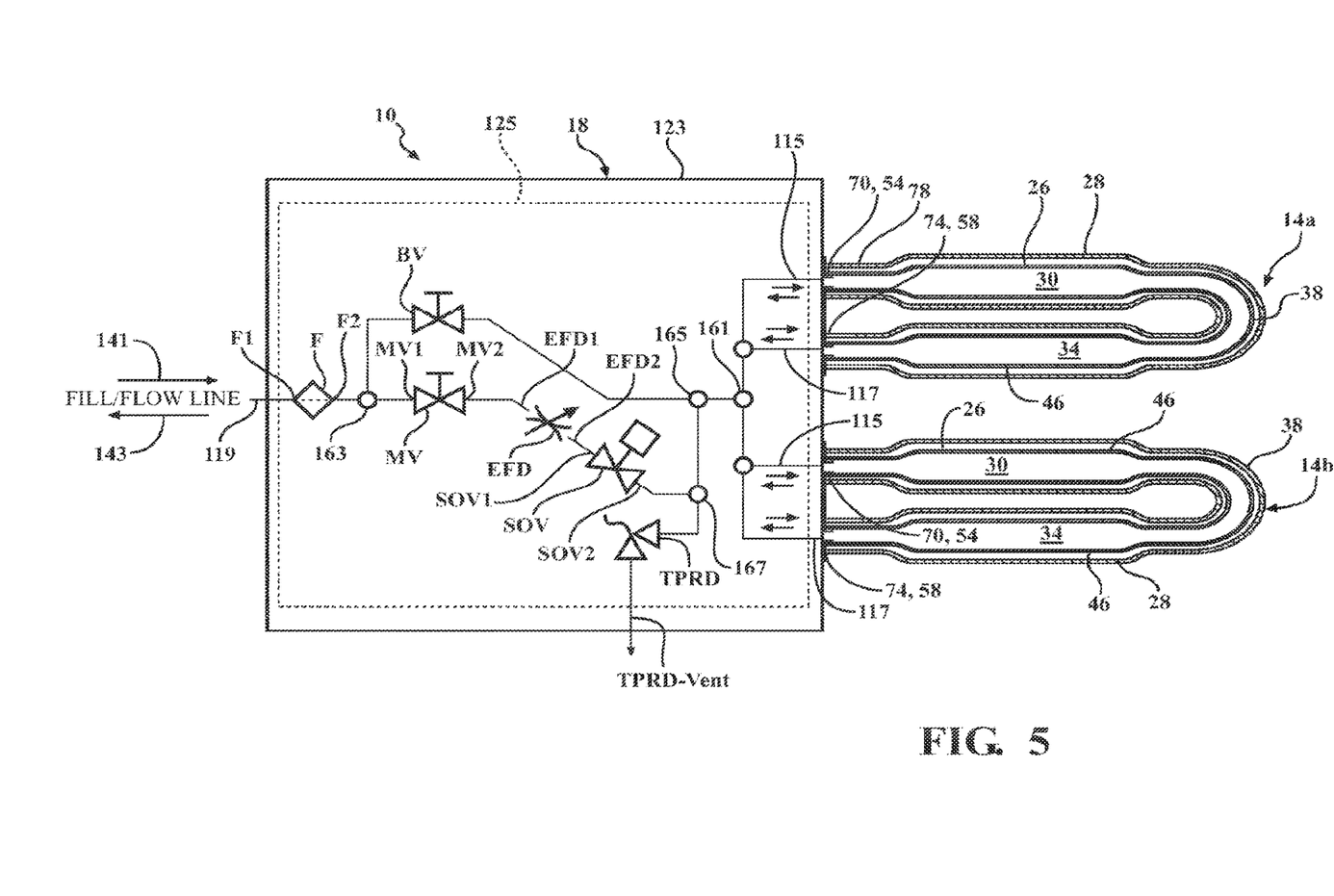
FIG. 5 is a diagrammatic view of the pressure vessel assembly of FIG. 1, illustrating one embodiment of the on-tank-valve manifold assembly.

FIG. 5 shows one embodiment of a functional block diagram of the internal structure 125 of the OTV manifold assembly 18. Elements in FIG. 5 that are the same or similar to those used above in FIGS. 1-3 have the same reference numbers for simplicity. In addition to the first and second filling couplers 115, 117 for each of the connected plurality of elongated conformable pressure tanks 14a, 14b, the OTV manifold assembly 18 includes a filling coupler 119 (referred herein as the third filling coupler 119) configured for passing fluid 34 into and out of the OTV manifold assembly 18, as illustrated by arrows 141 and 143. All of the first and second filling couplers 115, 117 are fluidically connected to a first junction 161 such that the fluid 34 is passed between the first junction 161 and each of the first and second filling couplers 115, 117 in parallel, i.e. the fluid 34 is supplied simultaneously to all of the first and second filling couplers 115, 117.

Also shown in FIG. 5, fluid 34 is passed through the third filling coupler 119 and into the OTV manifold assembly 18. The third filling coupler 119 is fluidically connected to an inlet F1 of a filter F. An outlet F2 of the filter F is fluidically coupled to a second junction 163. A bleed valve BV is fluidically connected between the second junction 163 and a third junction 165. In some embodiments, the third junction 165 is combined with the first junction 161 as a single junction 161, 165 and in other embodiments the third junction 165 is fluidically connected to the first junction 161. The bleed valve BV is configured to bleed the pressure vessel assembly 10 of fluid 34 when service or maintenance is required for the pressure vessel assembly 10. The bleed valve BV is downstream of the filter F and upstream of the first and second filling couplers 115, 117 during the filling process In addition, an inlet MVT of a manually controlled valve MV is fluidically coupled to the second junction 163 such that the manually controlled valve MV is downstream of the second junction 163 during the filling process, as illustrated in FIG. 5. The manually controlled valve MV has an outlet MV2 that is fluidically connected to an inlet EFD1 of an excess flow device EFD such that the excess flow device EFD is downstream of the manually controlled valve MV during the filling process. The manually controlled valve MV is configured to bypass the automatic shut off function, allowing the pressure vessel assembly 10 to be serviced. The excess flow device EFD includes a controllable valve that controls the flow of fluid 34 through the OTV manifold assembly 18.

Also shown in FIG. 5, an outlet EFD2 of the excess flow device EFD is fluidically coupled to an inlet SOV1 of a solenoid valve SOV having an automatic shut off. As such, the solenoid valve SOV is downstream of the excess flow device EFD during the filling process. Further, an outlet SOV2 of the solenoid valve SOV is fluidically coupled to a fourth junction 167 which is fluidically coupled to the third junction 165 and the first junction 161. Fluidically connected to the fourth junction 167 is a temperature pressure relief device TPRD which is further fluidically connected to a temperature pressure relief device vent TPRD-Vent. The temperature pressure relief device TPRD in combination with the temperature pressure relief device vent TPRD-Vent are configured to relieve excess pressure within the pressure vessel assembly 10. The temperature pressure relief device TPRD is fluidically positioned downstream of the solenoid valve SOV and upstream of the first and second filling couplers 115, 117 during the filling process. It will be understood that alternate embodiments include more and/or other components as desired for specific applications.

FIG. 6 shows a second embodiment of the pressure vessel assembly 10 having a OTV manifold assembly 18 directly coupled to a plurality of elongated conformable tanks 14a, 14b, 14c. Elements in FIG. 6 that are the same or similar to those used above in FIGS. 1-3 have the same reference numbers for simplicity. As with the embodiment shown in FIG. 5, the OTV manifold assembly 18 includes a filter F, a bleed valve BV, a manually controlled valve MV, an excess flow device EFD, a solenoid valve SOC with automatic shut off, and a temperature press relief device TPRD. However, the third junction 165 and the fourth junction 167 of FIG. 5 have been combined into a single junction 165 in FIG. 6. In addition, an elongated conformable tank 14c having a vertical stacking architecture 126b is connected to the OTV manifold assembly 18 along with the first and second elongated conformable tanks 14a, 14b that have a horizontal stacking architecture 126a. The individual length, number of chambers 46, and stacking architecture 126a, 126b varies among different embodiments of the pressure vessel assembly 10. The flexibility of adjusting the stacking architecture 126, 126a, 126b in combination with the number and length of each of the individual elongated conformable tanks 14a, 14b, 14c allows for maximizing internal tank volume within an available space for vehicle applications. As such, the individual elongated conformable tanks 14a, 14b, 14c can be adjusted in length and stacking architecture 126, 126a, 126b to fit around obstacles in a vehicle.

Figure 7:
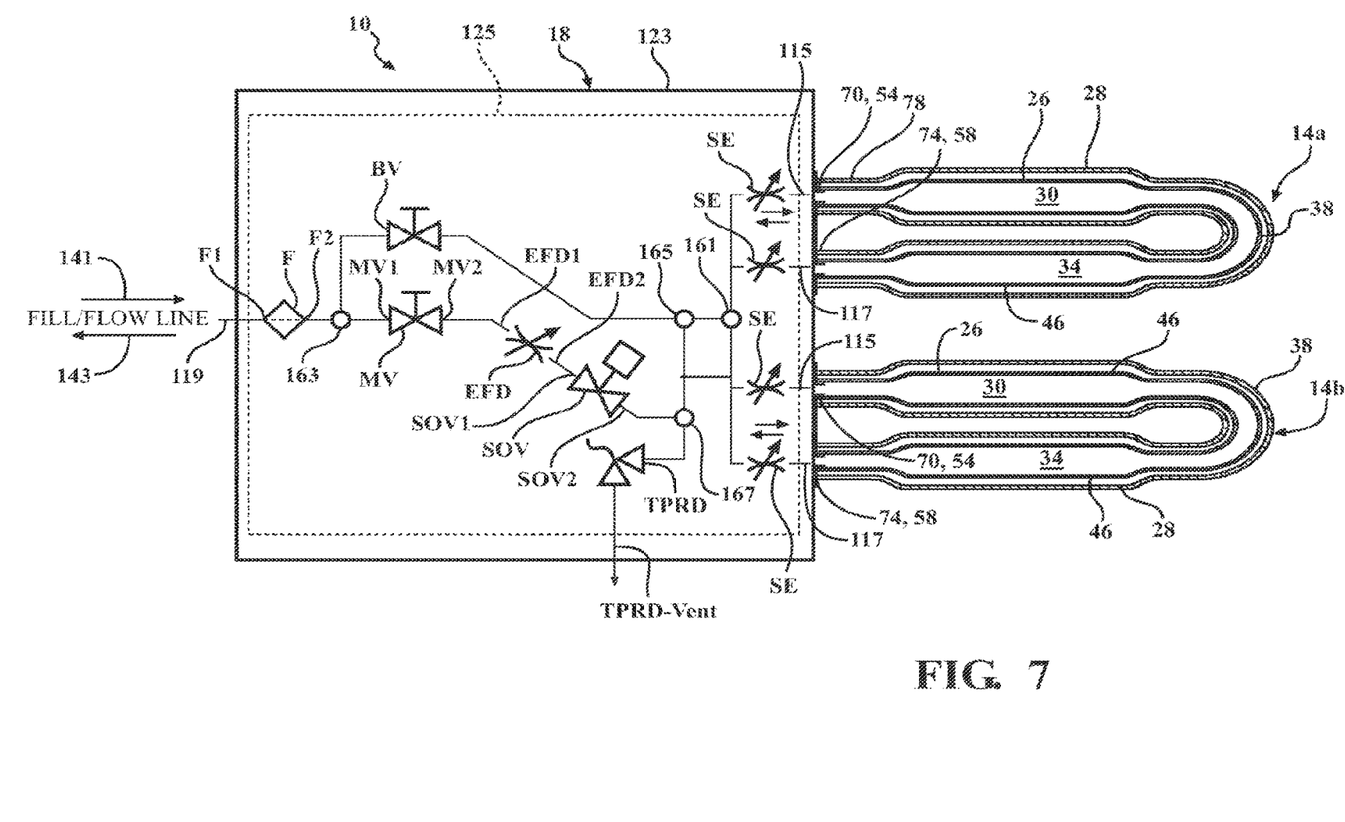
FIG. 7 is a diagrammatic view of the pressure vessel assembly of FIG. 5, illustrating a second embodiment of the on-tank-valve manifold assembly having supplemental excess flow devices inline with each of the directly coupled elongated conformable pressure tanks.

FIG. 7 shows another embodiment of the OTV manifold assembly 18 directly coupled to a plurality of elongated conformable pressure tanks 14a, 14b. Elements in FIG. 7 that are the same or similar to those used above in FIGS. 1-3 have the same reference numbers for simplicity. As with the embodiments shown in FIGS. 5 and 6, the OTV manifold assembly 18 includes a filter F, a bleed valve BV, a manually controlled valve MV, an excess flow device EFD, a solenoid valve SOC with automatic shut off, and a temperature press relief device TPRD. However, supplemental excess flow devices SE are positioned downstream (during the filling process) of the first junction 161 and upstream (during the filling process) of each of the first filling couplers 115 and the second filling couplers 117. In certain embodiments it is desirable to have an excess flow device SE in line with each of the first and second filling couplers 115, 117 for the plurality of elongated conformable pressure vessel tanks 14a, 14b. In other embodiments, excess flow devices SE are included in line with a subset of the first and second filling couplers 115, 117.

Figure 8:
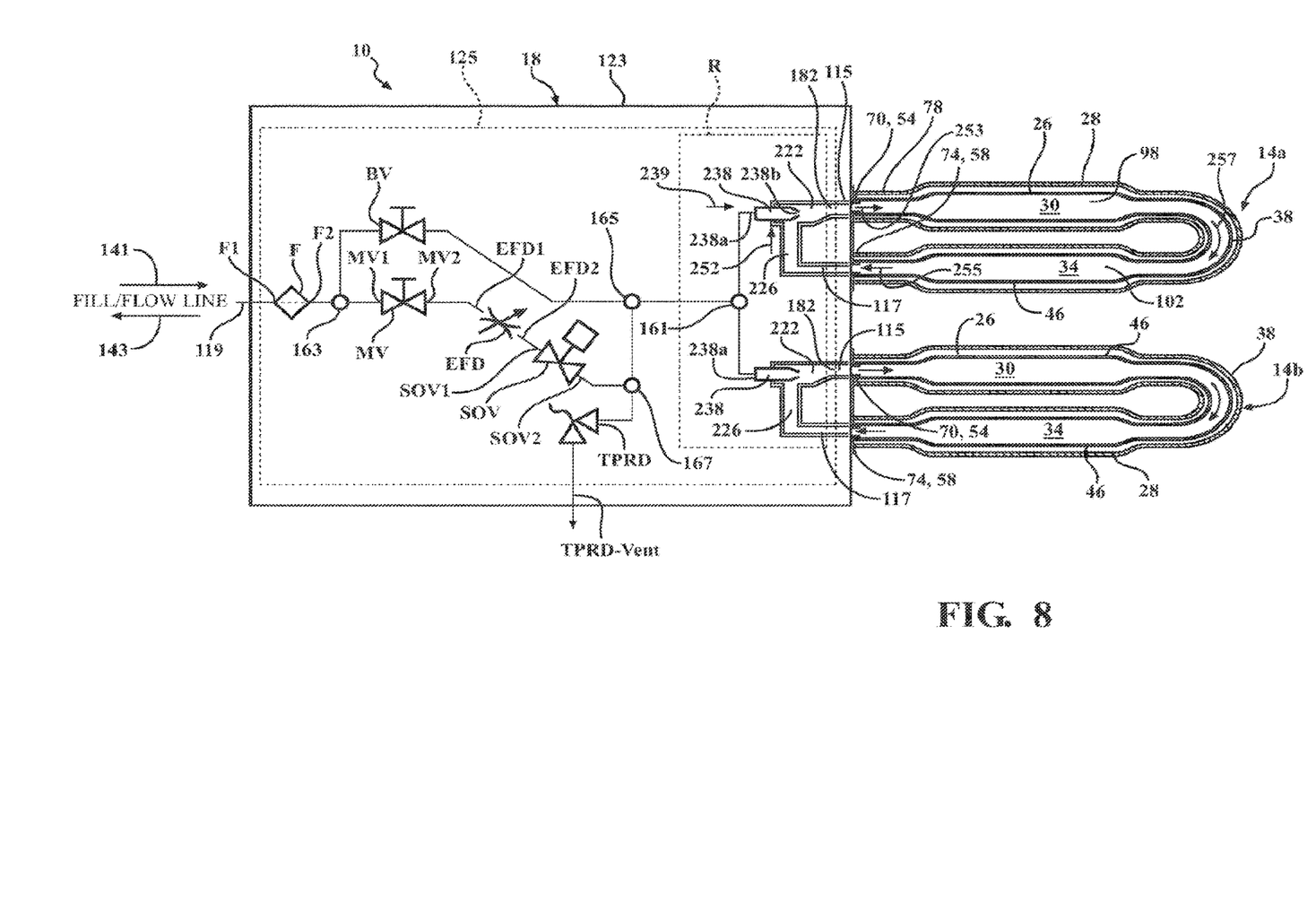
FIG. 8 is a diagrammatic view of another embodiment of the pressure vessel assembly of FIG. 5, illustrating integrated recirculation within the on-tank-valve manifold assembly.
Figure 9:
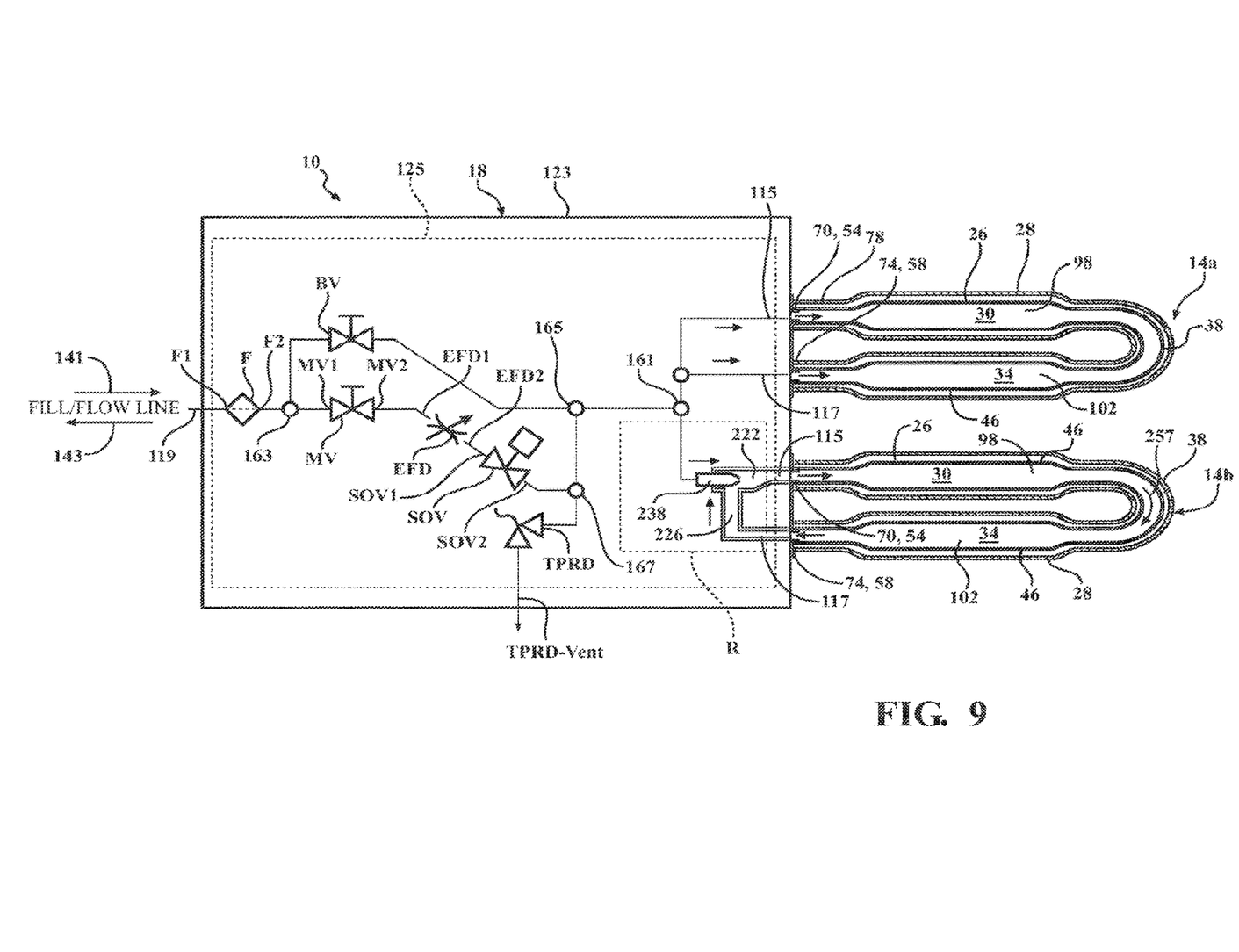
FIG. 9 is a diagrammatic view of the pressure vessel assembly of FIG. 8, illustrating an alternate embodiment of the on-tank-valve manifold assembly having integrated recirculation.
Figure 10:
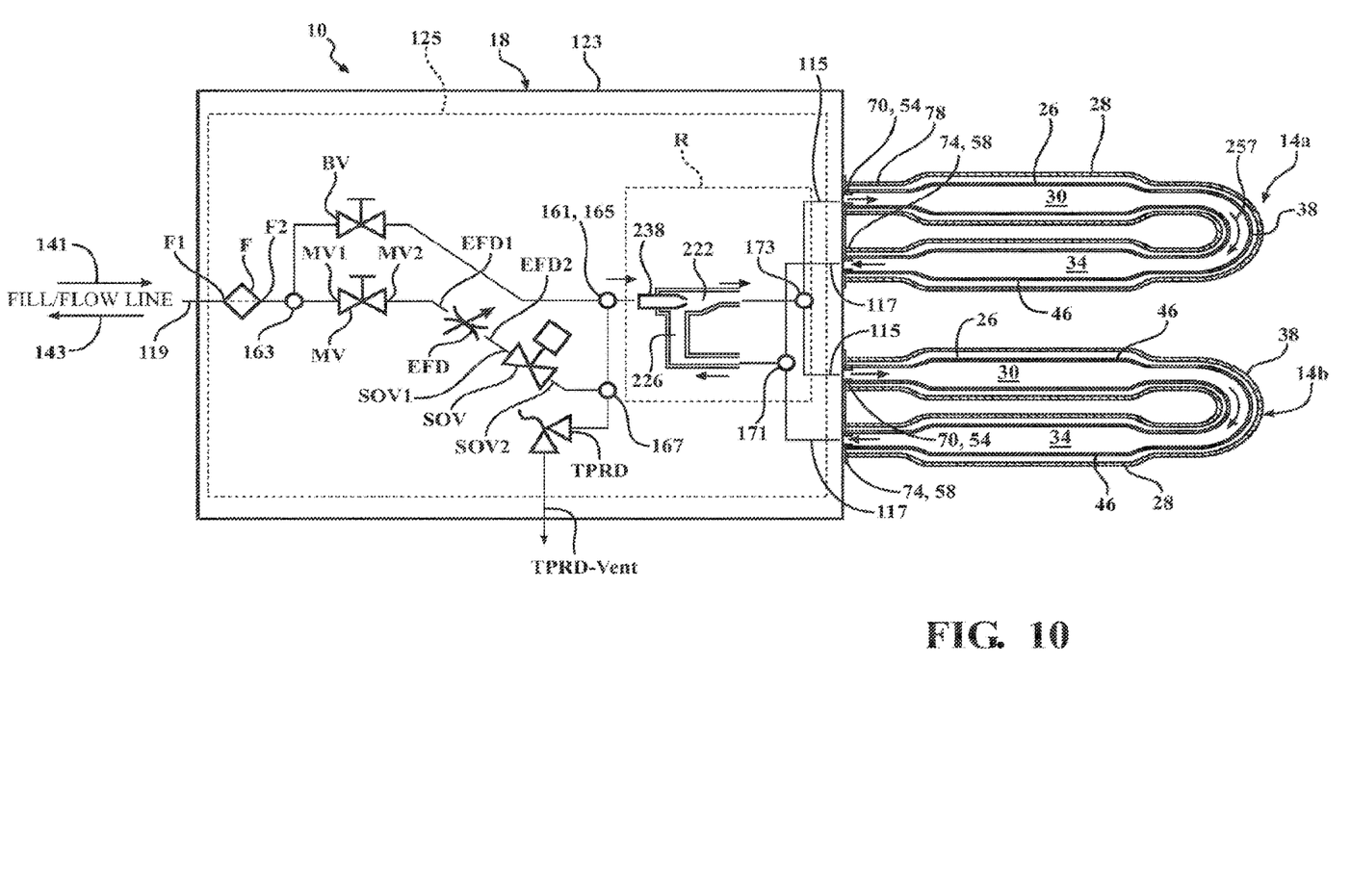
FIG. 10 is a diagrammatic view of the pressure vessel assembly of FIG. 8, illustrating yet another alternative embodiment of the on-tank-valve manifold assembly having integrated recirculation.

FIGS. 8 through 10 show alternate embodiments of the OTV manifold assembly 18 that include a recirculation function R. Elements in FIGS. 8 through 10 that are the same or similar to those used above in FIGS. 1-3 have the same reference numbers for simplicity. As with the embodiments shown in FIGS. 5 and 6, the OTV manifold assembly 18 includes a filter F, a bleed valve BV, a manually controlled valve MV, an excess flow device EFD, a solenoid valve SOC with automatic shut off, and a temperature press relief device TPRD. Referring to FIG. 8, the recirculation function R includes recirculation between the outlet opening 74 and the inlet opening 70 through the OTV manifold assembly 18 for each one of the elongated conformable tanks 14a, 14b.

Referring to FIG. 8, Venturi mixing chambers 222 are fluidically coupled through a first high pressure line 182 to each of the first filling couplers 115. A suction line 226 is fluidically coupled between each of the second filling couplers 117 and the respective Venturi mixing chamber 222. Both the first high pressure line 182 and the suction line 226 are fully enclosed by the outer housing 123 of the OTV manifold assembly 18. A Venturi nozzle 238 (also known as an eductor or an ejector) has a nozzle inlet 238a fluidically coupled to the first junction 161 and provides fluid 34 to the Venturi mixing chamber 222 through a nozzle outlet 238b. The flow of fluid 34 through the Venturi nozzle 238 during the filling process is illustrated by arrow 239. The Venturi nozzles 238 are used to circulate fluid flow during the filling process, which can result in lower maximum temperatures of the fluid 34 and/or of the elongated conformable tanks 14a, 14b during the filling process. Optionally, one or more temperature sensors are thermally coupled to the Venturi nozzle 238 and/or the Venturi mixing chamber 222 and configured to detect the temperature of the fluid 34 passing from the Venturi nozzle 238 and into the Venturi mixing chamber 222. In addition, an additional temperature sensor is optionally included and configured to detect the temperature of the fluid 34 passing through the suction line 226.

The recirculation of fluid 34 through the OTV manifold assembly 18 between the last chamber 102 and the first chamber 98 during a filling process is illustrated in FIG. 8. When external fluid 34 is supplied through the third filling coupler 119 to the Venturi nozzle 238, fluid 34 is ejected through the nozzle outlet 238b at an elevated pressure as indicated by arrow 239. The movement of the fluid 34 into the Venturi mixing chamber 222 draws fluid 34 from the suction line 226 as illustrated by arrow 252. The fluid 252 from the suction line 226 mixes with the fluid 239 from the Venturi nozzle 238 in the Venturi mixing chamber 222. The mixed fluid 239, 252 flows through the high pressure line 182 and is supplied to the first chamber 98 of the elongated conformable tank 14a, 14b, as illustrated by arrow 253. Movement of fluid 252 through the suction line 226 draws fluid 34 from the last chamber 102 of the elongated conformable tank 14a, 14b, as illustrated by arrow 255. The flow of fluid 255 from the last chamber 102, through the suction line 226, through the Venturi mixing chamber 222, and into the first chamber 98 also causes fluid to flow through the entire length of the elongated conformable tank 14a, 14b, as illustrated by arrow 257. The movement of the fluid 34 through the entire length of the elongated conformable tank 14a, 14b reduces the temperature rise within individual chambers 98, 102 during the fill process.

FIG. 9 illustrates an alternate embodiment of the recirculation function R wherein the OTV manifold assembly 18 includes a Venturi nozzle 238, a Venturi mixing chamber 222, and a suction line 226 for one of the elongated conformable tanks 14b configured to recirculate fluid 34 from the last chamber 102 of the elongated conformable tank 14b through the OTV manifold assembly 18 and into the first chamber 98 of the elongated conformable tank 14b. However, the OTV manifold assembly 18 lacks a recirculation function R for the other one of the elongated conformable tanks 14a. As such, during the filling process, fluid 34 is provided simultaneously to both the inlet opening 70 and the outlet opening 74 of this elongated conformable tank 14a. In certain embodiments it is desirable to add the recirculation function R for individual elongated tanks 14a, 14b depending on the heat dissipation during the filling process. In some cases, the recirculation function R can be omitted if the expected heat rise during the filling process is less than a desired amount.

FIG. 10 illustrates an alternate embodiment of the recirculation function R having a single Venturi nozzle 238 fluidically connected between the first junction 161 and a Venturi mixing chamber 222. A suction line 226 is fluidically connected between the Venturi mixing chamber 222 and an outlet junction 171. Each of the outlet openings 74 of the elongated conformable tanks 14a, 14b are fluidically connected to the outlet junction 171. Each of the inlet openings 70 of the elongated conformable tanks 14a, 14b are fluidically connected to an inlet junction 173. The Venturi mixing chamber 222 provides mixed fluid to the inlet junction 173 during the filling process. The mixed fluid is further provided simultaneously to all of the inlet openings 70 of the elongated conformable tanks 14a, 14b connected to the inlet junction 173. Supplied fluid passing through the Venturi nozzle 238 draws fluid from the suction line 226. The movement of fluid through the suction line 226 simultaneously draws fluid from all of the outlet openings 74 of the elongated conformable tanks 14a, 14b. The movement of fluid out of the outlet openings 74 in addition to the movement of fluid into the inlet openings 70 results in fluid movement along the elongated conformable tanks 14a, 14b, as illustrated by arrow 257.

One benefit of the pressure vessel assembly having an On-Tank-Valve (OTV) manifold assembly directly coupled to a plurality of elongated conformable pressure tanks is the temperature gradient within each of the elongated conformable pressure tanks can be maintained within desired limits during a fill process since the fluid is provided to a plurality of inlet openings and outlet openings associated with a plurality of conformable pressure tanks instead of solely providing the fluid to a single inlet opening and a single outlet opening of a longer length conformable pressure tank.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

What is claimed is:

1. A pressure vessel assembly comprising:
    a plurality of elongated folded tanks, each one of said plurality of elongated folded tanks having an interior for storage of fluid within a polymeric liner defined by an elongated cylindrical wall extending between a first tank end and a second tank end, said polymeric liner having a plurality of chambers for storage of fluid, said plurality of chambers including at least a first chamber adjacent said first tank end and a last chamber adjacent said second tank end, said polymeric liner surrounded by an outer composite shell of resin and fiber; and
    an on-tank-valve (OTV) manifold assembly directly coupled to said plurality of elongated folded tanks, said OTV manifold assembly comprising:
        a plurality of first filling couplers operatively coupled to a respective one of said first tank ends;
        a plurality of second filling couplers operatively coupled to a respective one of said second tank ends; and
        a third filling coupler for selectively coupling said OTV manifold assembly to an external fluid source for receiving a flow of fluid from said external fluid source;
        wherein said OTV manifold assembly receives fluid from said external fluid source through said third filling coupler and selectively provides said fluid to one or more of said plurality of first filling couplers and said plurality of second filling couplers; and
        wherein said OTV manifold assembly is configured to selectively transfer fluid from one or more or said plurality of elongated folded tanks through said third filling coupler.

2. The pressure vessel assembly as set forth in claim 1, wherein:
    said OTV manifold assembly includes a fourth filling coupler for selectively coupling said OTV manifold assembly to a temperature pressure relief device vent.

3. The pressure vessel assembly as set forth in claim 1, wherein:
    said OTV manifold assembly includes a solenoid valve having an automatic shut off fluidically coupled between said third filling coupler and said plurality of first filling couplers and said plurality of second filling couplers.

4. The pressure vessel assembly as set forth in claim 3, wherein:
    said OTV manifold assembly includes a manually controlled valve fluidically coupled between said third filling coupler and said solenoid valve having said automatic shut off, said manually controlled valve configured to bypass said solenoid valve having said automatic shut off.

5. The pressure vessel assembly as set forth in claim 4, wherein:
    said OTV manifold assembly includes a first excess flow device fluidically coupled between said manually controlled valve and said solenoid valve having said automatic shut off.

6. The pressure vessel assembly as set forth in claim 5, wherein:
    said OTV manifold assembly includes a plurality of first excess flow devices, each one of said plurality of first excess flow devices fluidically coupled between said solenoid valve having said automatic shut off and a respective one of said plurality of first filling couplers.

7. The pressure vessel assembly as set forth in claim 6, wherein:
    said OTV manifold assembly includes a plurality of second excess flow devices, each one of said plurality of second excess flow devices fluidically coupled between said solenoid valve having said automatic shut off and a respective one of said plurality of second filling couplers.

8. The pressure vessel assembly as set forth in claim 1, wherein:
    said OTV manifold assembly includes a temperature pressure relief device.

9. The pressure vessel assembly as set forth in claim 1, wherein:
    said OTV manifold assembly includes a bleed valve fluidically coupled between said third filling coupler and said plurality of first filling couplers and said plurality of second filling couplers.

10. The pressure vessel assembly as set forth in claim 1, wherein said OTV manifold assembly is configured to selectively fill one or more of said plurality of elongated folded tanks.

11. The pressure vessel assembly as set forth in claim 1, wherein said fluid is one or more of hydrogen gas and natural gas.

12. The pressure vessel assembly as set forth in claim 1, wherein said OTV manifold assembly includes a recirculation function configured to mix fluid removed from one of said plurality of elongated folded tanks with fluid received through said third filling coupler and provide said mixed fluid to one of said plurality of elongated folded tanks during a fill process.

13. A pressure vessel assembly comprising:
    a plurality of elongated folded tanks, each one of said plurality of elongated folded tanks having an interior for storage of fluid within a polymeric liner defined by an elongated cylindrical wall extending between a first tank end and a second tank end, said polymeric liner having a plurality of chambers for storage of fluid, said plurality of chambers including at least a first chamber adjacent said first tank end and a last chamber adjacent said second tank end, said polymeric liner surrounded by an outer composite shell of resin and fiber; and
    an on-tank-valve (OTV) manifold assembly directly coupled to said plurality of elongated folded tanks, said OTV manifold assembly comprising:
    a plurality of first filling couplers operatively coupled to a respective one of said first tank ends;
    a plurality of second filling couplers operatively coupled to a respective one of said second tank ends; and
    a third filling coupler for selectively coupling said OTV manifold assembly to an external fluid source for receiving a flow of fluid from said external fluid source;
    wherein said OTV manifold assembly receives fluid from said external fluid source through said third filling coupler and selectively provides said fluid to one or more of said plurality of first filling couplers and said plurality of second filling couplers;
    said OTV manifold assembly includes a solenoid valve having an automatic shut off fluidically coupled between said third filling coupler and said plurality of first filling couplers and said plurality of second filling couplers; and said OTV manifold assembly includes a manually controlled valve fluidically coupled between said third filling coupler and said solenoid valve having said automatic shut off, said manually controlled valve configured to bypass said solenoid valve having said automatic shut off.

14. The pressure vessel assembly as set forth in claim 13, wherein:

said OTV manifold assembly includes a first excess flow device fluidically coupled between said manually controlled valve and said solenoid valve having said automatic shut off.

15. The pressure vessel assembly as set forth in claim 14, wherein:

said OTV manifold assembly includes a plurality of first excess flow devices, each one of said plurality of first excess flow devices fluidically coupled between said solenoid valve having said automatic shut off and a respective one of said plurality of first filling couplers.

16. The pressure vessel assembly as set forth in claim 15, wherein:

said OTV manifold assembly includes a plurality of second excess flow devices, each one of said plurality of second excess flow devices fluidically coupled between said solenoid valve having said automatic shut off and a respective one of said plurality of second filling couplers.

17. A pressure vessel assembly comprising:

a plurality of elongated folded tanks, each one of said plurality of elongated folded tanks having an interior for storage of fluid within a polymeric liner defined by an elongated cylindrical wall extending between a first tank end and a second tank end, said polymeric liner having a plurality of chambers for storage of fluid, said plurality of chambers including at least a first chamber adjacent said first tank end and a last chamber adjacent said second tank end, said polymeric liner surrounded by an outer composite shell of resin and fiber; and an on-tank-valve (OTV) manifold assembly directly coupled to said plurality of elongated folded tanks, said OTV manifold assembly comprising:

a plurality of first filling couplers operatively coupled to a respective one of said first tank ends;

a plurality of second filling couplers operatively coupled to a respective one of said second tank ends; and a third filling coupler for selectively coupling said OTV manifold assembly to an external fluid source for receiving a flow of fluid from said external fluid source;

wherein said OTV manifold assembly receives fluid from said external fluid source through said third filling coupler and selectively provides said fluid to one or more of said plurality of first filling couplers and said plurality of second filling couplers; and wherein said OTV manifold assembly includes a recirculation function configured to mix fluid removed from one of said plurality of elongated folded tanks with fluid received through said third filling coupler and provide said mixed fluid to one of said plurality of elongated folded tanks during a fill process.

* * * * *